United States Patent [19]
Gutierrez et al.

[11] Patent Number: 6,066,937
[45] Date of Patent: May 23, 2000

[54] QUICK START UNIT

[76] Inventors: Alejandro Gutierrez; Abel Gutierrez, Jr., both of 201 S. 5th St., McAllen, Tex. 78501

[21] Appl. No.: 09/267,364

[22] Filed: Mar. 15, 1999

Related U.S. Application Data

[60] Provisional application No. 60/081,321, Apr. 10, 1998.

[51] Int. Cl.[7] ........................................ H02J 7/00
[52] U.S. Cl. ........................... 320/104; 320/105; 307/64; 307/149; 322/1
[58] Field of Search .................... 320/105, 104; 307/64, 149; 322/1

[56] References Cited

U.S. PATENT DOCUMENTS

| | | | |
|---|---|---|---|
| 2,813,984 | 11/1957 | Dolecki et al. | 290/10 |
| 3,656,044 | 4/1972 | King | 322/1 |
| 4,595,841 | 6/1986 | Yaguchi | 290/1 A |
| 4,914,373 | 4/1990 | Rivkine | 322/1 |
| 5,111,127 | 5/1992 | Johnson | 320/101 |
| 5,614,807 | 3/1997 | Duley | 320/162 |

FOREIGN PATENT DOCUMENTS 2595268   11/1987   France .

*Primary Examiner*—Peter S. Wong
*Assistant Examiner*—Gregory J Toatley, Jr.
*Attorney, Agent, or Firm*—Richard C. Litman

[57] ABSTRACT

A quick start unit for charging dead batteries and starting vehicles. The quick start unit includes a small portable base platform with a handle to pull, push, or maneuver. The base platform is substantially flat and is suitably mounted on three wheels. A control panel is mounted on the platform via a vertical mount. A low horsepower gasoline engine is mounted on the platform and has an output shaft to which an input shaft of one or two alternators are coupled for rotation. The control panel includes a 12-volt push button, one 12-volt two position power toggle switch, one 12-volt tow or three position alternator toggle switch, one or two amperage gauges, two voltage gauges, a green indicator light, an amber indicator light, a red indicator light, and an audible alarm.

12 Claims, 3 Drawing Sheets

QUICK START UNIT

CROSS-REFERENCE TO RELATED APPLICATION

This application claims the benefit of U.S. Provisional Patent Application Ser. No. 60/081,321, filed Apr. 10, 1998.

BACKGROUND OF THE INVENTION

1. Field of the Invention

The present invention relates to an engine starting apparatus for cranking an internal combustion engine.

2. Description of Related Art

Vehicle batteries sometimes become inadvertently discharged to the extent that there is insufficient power to be able to crank and/or start a vehicle. Such a condition may arise because the operator of a vehicle has mistakenly left the lights, radio, or other electrical power consuming device or accessory running in the vehicle after the ignition has been turned off. Without the engine, and thus the alternator, running, the only source of power is the battery which in time can be sufficiently depleted to reduce its reserve capacity below that needed to restart the engine. A similar reduced capacity condition for the battery can occur when the battery has degraded with age so that it is incapable of starting the vehicle at a low ambient temperature or is near the end of its useful life and is incapable of holding a charge over a long period of time. It is recognized by those skilled in the art that a vehicle battery under such conditions is often referred to as a "dead" battery even though it is only depleted to an extent that it is incapable of starting the engine. There are several recognized means for restoring a battery to a charged condition. The most common includes starting the engine, by whatever means is available, and allowing the alternator of the running engine to simply recharge the battery through a normal recharging circuitry typically incorporated in the electrical system of most vehicles.

The related art is represented by the following patents of interest.

U.S. Pat. No. 2,813,984, issued on Nov. 19, 1957 to Matthew J. Dolecki et al., describes an electric generating system for a mine vehicle propelled by a plurality of electrical traction motors. Dolecki et al. do not suggest a quick start unit according to the claimed invention.

U.S. Pat. No. 3,656,044, issued on Apr. 11, 1972 to Ansel A. King, describes a self-contained portable apparatus for charging dead batteries that includes an alternator which is driven by a gasoline motor. King does not suggest a quick start unit according to the claimed invention.

U.S. Pat. No. 4,595,841, issued on Jun. 17, 1986 to Tadahiro Yaguchi, describes a full-covered portable electric generator comprising a generator core and an engine for driving the generator core enclosed by a cover comprising discrete front, rear and bottom cover elements. Yaguchi does not suggest a quick start unit according to the claimed invention.

U.S. Pat. No. 4,914,373, issued on Apr. 3, 1990 to Jacques Rivkine, describes an electric generator set comprising an internal combustion engine driving a three-phase generator. Rivkine does not suggest a quick start unit according to the claimed invention.

U.S. Pat. No. 5,111,127, issued on May 5, 1992 to Woodward Johnson, describes a portable power supply. Johnson does not suggest a quick start unit according to the claimed invention.

France Patent document 2,598,268, published on Nov. 6, 1987, describes an electric generator using an alternator. France '268 does not suggest a quick start unit according to the claimed invention.

None of the above inventions and patents, taken either singly or in combination, is seen to describe the instant invention as claimed.

SUMMARY OF THE INVENTION

The present invention is a self-contained portable quick start unit for charging dead batteries and starting vehicles. The quick start unit includes a small portable base platform with a handle to pull, push, or maneuver. The handle includes a plurality of laterally extending arms as a means for conveniently carrying cables or other accessories. The base platform is substantially flat and is suitably mounted on three wheels. A front pair of air inflated wheels are joined by an axle and a rear wheel is mounted for swivel operation for maneuverability purposes so that the unit can be guided to a desired location. The base platform may be constructed of any suitable material, such as iron, steel or the like.

A control panel is mounted on the platform via a vertical mount. A low horsepower gasoline engine is mounted on the platform and has an output shaft to which an input shaft of one or two alternators are coupled for rotation. The number of alternators employed depends on the desires of the user. The use of two alternators reduces the speed required to start a vehicle. The engine is preferably a 5–6 or 11–12 horsepower engine. The engine may either be pull started or electrically started. The quick starting unit has the capability of providing approximately a 130–160 amperage output or a 260–320 amperage output. Each alternator is coupled to the engine via belt driven pulleys. Each alternator has the capability of providing a range from about 130 to 160 amperage output. The alternators may be any suitable alternators. An approximately 250 cranking amperage battery is also mounted on the platform which will start the engine by electric start. The battery is also used to excite the alternators to produce amperage output, when batteries to be charged are very low on voltage.

The control panel includes a 12-volt push button which functions as a switch to make the alternator or alternators produce amperage for batteries that are very low on voltage. A first 12-volt, two position power toggle switch functions as an ignition key to turn the unit on or off. A second 12-volt, two position alternator toggle switch functions as a switch to make the alternator produce or not produce amperage output. The control panel also includes one or two amperage gauges to indicate whether the alternator or alternators are producing or not producing amperage output, and how much amperage output. The control panel also includes a voltage gauge for each alternator on the platform to indicate the condition of a charged or uncharged external battery, and a voltage gauge for indicating the condition of the cranking battery mounted on the platform.

The control panel also includes a plurality of indicator lights and an audible alarm to indicate to the user whether proper connections are made between the alternators and an external battery. One or two red indicator lights and an alarm are used to indicate a wring connection between battery cables and batteries. Two red indicator lights are employed on a quick starting unit which employs two alternators, one for each amperage selection. The red indicator lights and the alarm will stay off only with proper connections. A green indicator light will come on when the two position power toggle switch to turn the quick starting unit on and off is in the on position. An amber indicator light will come on when the two position alternator toggle switch is turned to the on position to allow the alternator or alternators to produce amperage output.

The quick starting unit includes two or three 5 amperage 12-volt automatic reset breakers which function as safety features to protect the alternators mounted on the platform from damage, and to protect the 12-volt system and associated circuitry in a vehicle to be started from damage by the quick starting unit. One or two 12-volt relays function automatic shut downs when wrong cable connections are made. One or two 12-volt solenoids function as connections between batteries and alternators, and vise versa. The quick starting unit includes a set of two 4 gauge cables of 12 foot each for each alternator. Each set of cables includes a positive cable with a red clamp and a negative cable with a black clamp.

Accordingly, it is a principal object of the invention to provide a portable quick start unit for charging dead batteries and starting vehicles that includes a low horsepower gasoline engine, one or two alternators, and a cranking battery.

It is another object of the invention to provide a quick start unit which includes a control panel including voltage and amperage gauges and indicator lights.

It is an object of the invention to provide improved elements and arrangements thereof in a quick start unit for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
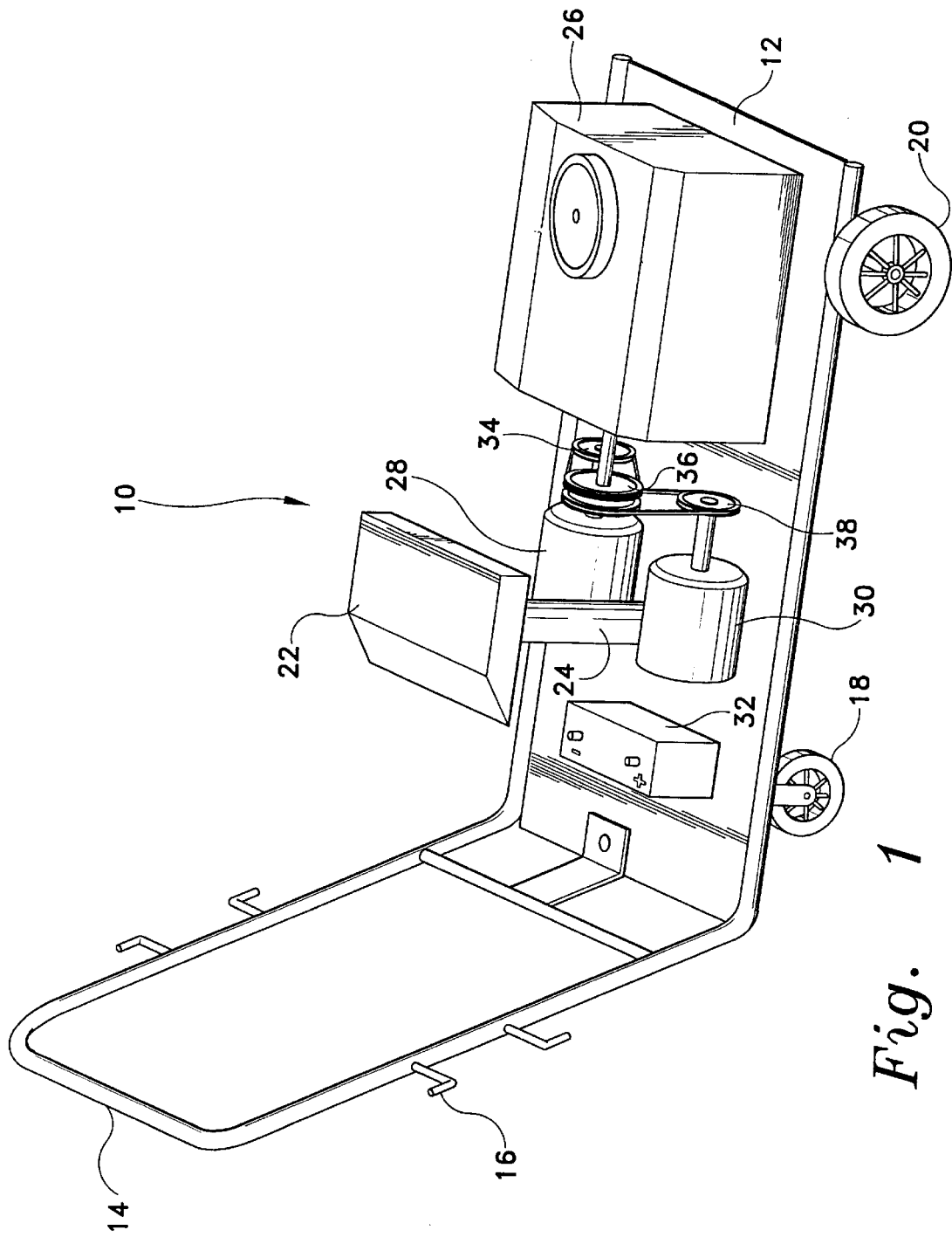
FIG. 1 is a perspective side view of a quick start unit according to the present invention.

Referring now to FIG. 1, shown therein and designated by the general reference numeral 10 is a quick start unit in accordance with the present invention. The quick start unit 10 includes a small portable base platform 12 including a handle 14 to pull, push, or maneuver. The handle 14 includes a plurality of laterally extending arms 16 as a means for conveniently carrying cables or other accessories. The base platform 12 is substantially flat and is suitably mounted on three wheels. A front pair of air inflated wheels 20 are joined by an axle and a rear wheel 18 is mounted for swivel operation for maneuverability purposes so that the quick start unit 10 can be guided to a desired location. The base platform 12 may be constructed of any suitable material, such as iron, steel or the like.

A control panel 22 is mounted on the platform 12 via a vertical mount 24. A low horsepower gasoline engine 26 is mounted on the platform 12 and has an output shaft to which an input shaft of one or two alternators are coupled for rotation. The number of alternators employed depends on the desires of the user. The use of two alternators reduces the speed required to start a vehicle. The engine is preferably a 5–6 or 11–12 horsepower engine. The engine 26 may either be pull started or electrically started. The quick start unit 10 preferably has the capability of providing an approximately a 130–160 amperage output or a 260–320 amperage output. Two alternators 28, 30 are shown in FIG. 1 for providing an aproximately 260–320 amperage output capability. Each alternator 28, 30 is coupled to the engine 26 via belt driven pulleys 34, 36, 38. Each alternator preferably has the capability of providing a range from about 130 to about 160 amperage output. The alternators 28, 30 may be any suitable alternators. An approximately 250 cranking amperage battery 32 is also mounted on the platform 12 which will start the engine 26 by electric start. The battery 32 will also be used to excite the alternators 28, 30 to produce amperage, when batteries to be charged are very low on voltage.

The control panel 22 includes a 12-volt push button which functions as a switch to make the alternator or alternators produce amperage for batteries that are very low on voltage—8 volts or less is considered low. A first 12-volt two position power toggle switch functions as an ignition key to turn the unit on or off. A second 12-volt two or three position alternator toggle switch functions as a switch to make the alternator produce or not produce amperage output. A two position alternator toggle switch is preferably employed in a quick start unit employing one alternator, while a three position alternator toggle switch is preferably employed in a quick start unit employing two alternators.

The control panel 22 also includes one or two amperage gauges to indicate whether the alternator or alternators are producing or not producing amperage output, and how much amperage output. On a quick start unit 10 with two alternators, one amperage gauge is used for a 130 amperage selection and one amperage gauge is used for a 260 amperage selection. The control panel 22 also includes a voltage gauge for each alternator on the platform 12 to indicate the condition of a charged or uncharged external battery, and a voltage gauge for indicating the condition of the cranking battery 32 mounted on the platform 12.

The control panel 22 also includes a plurality of indicator lights and an audible alarm to indicate to the user whether proper connections are made between the alternators and an external battery. One or two red indicator lights and an alarm are used to indicate a wrong connection between battery cables and batteries. Two red indicator lights are employed on a quick starting unit 10 which employs two alternators, one for each amperage selection. The red indicator lights and the alarm will stay off only with proper connections. A green indicator light will come on when the two position power toggle switch to turn the quick starting unit in and off is in the on position. An amber indicator light will come on when the two position alternator toggle switch is turned to the on position to allow the alternator or alternators to produce amperage output.

The quick starting unit 10 includes two or three 5 amperage 12-volt automatic reset breakers which function as safety features to protect the alternators mounted on the platform 12 from damage, and to protect the 12-volt system and associated circuitry in a vehicle to be started from damage by the quick starting unit 10. One or two 12-volt relays function automatic shut downs when wrong cable connections are made. One or two 12-volt solenoids function as connections between batteries and alternators, and vise versa. The quick starting unit 10 includes a set of two 4 gauge cables of 12 feet each for each alternator. Each set of cables includes a positive cable with a red clamp and a negative cable with a black clamp.

Figure 2:
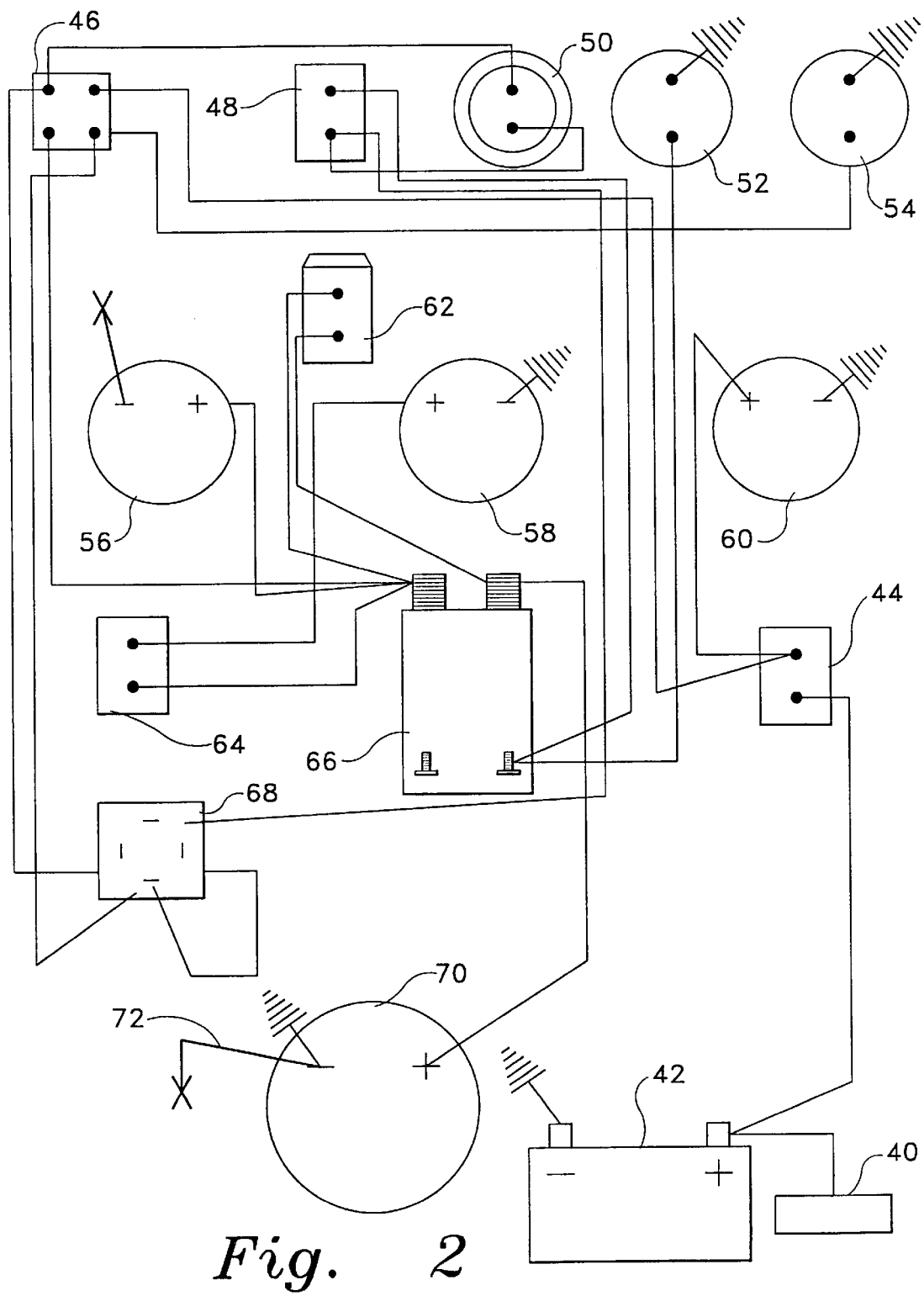
FIG. 2 is a schematic diagram of a quick start unit according to the invention.
Figure 3:
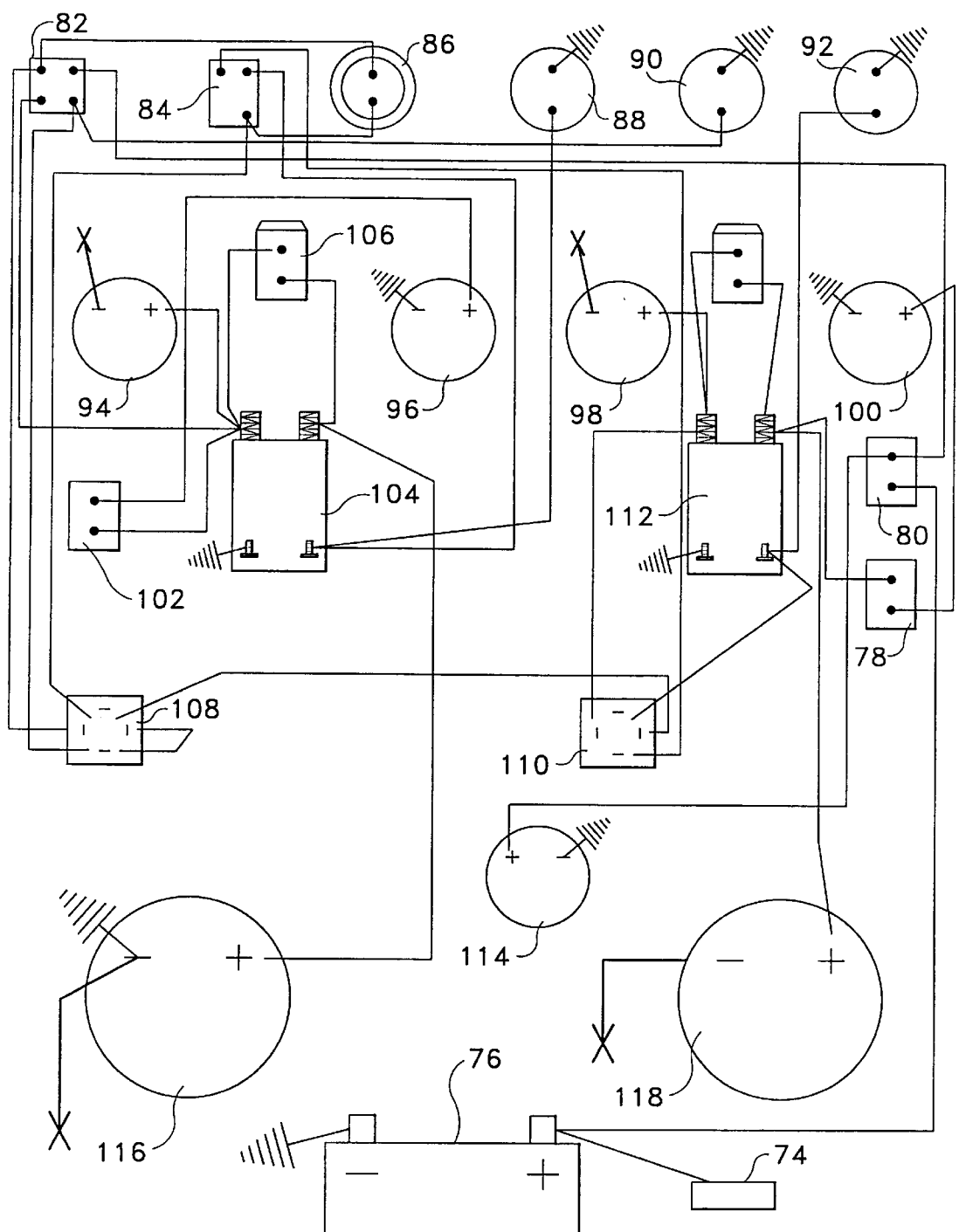
FIG. 3 is a schematic diagram of a quick start unit according to the invention.

FIG. 2 illustrates a schematic diagram of a quick starting unit configured with one alternator for generating an approximately 130–160 amperage output. FIG. 3 illustrates a schematic diagram of a quick starting unit configured with two alternators for generating an approximately 260–320 amperage output. FIG. 2 includes a unit starter 40 electrically connected to a cranking battery 42. The cranking battery is electrically connected to 5 amperage 12-volt automatic reset breaker 44 to protect the alternator 70 from damage, and to protect the 12-volt system and associated circuitry in a vehicle to be started from damage by the quick starting unit. The schematic further includes a 12-volt two position power toggle switch 46, a 12-volt push button two position alternator toggle switch 48, a 12-volt push button switch 50, a 12-volt amber indicator light 52, a 12-volt green indicator light 54, a 12-volt amperage gauge 56, a 12-volt voltage gauge 58, a 12-volt gauge 60, a 12-volt red indicator light 62, a 5 amperage 12-volt reset breaker 64, a 12-volt solenoid 66, a 12-volt relay 68, and an approximately 130–160 ampere alternator 70.

FIG. 3 includes a unit starter 74 electrically connected to a cranking battery 76. The cranking battery is electrically connected to a 5 ampere 12-volt automatic reset breaker 80 to protect the alternators 116, 118 from damage, and to protect the 12-volt system and associated circuitry in a vehicle to be started from damage by the quick starting unit. The schematic further includes a 5 ampere 12-volt reset breaker 78, a 12-volt two position power toggle switch 82, a 12-volt three position alternator toggle switch 84, a 12-volt push button switch 86, a 12-volt amber indicator light 88, a 12-volt green indicator light 90, a 12-volt amber indicator light 92, a 12-volt low side amperage gauge 94, a 12-volt low side voltage gauge 96, a 12-volt high side amperage gauge 98, a 12-volt high side voltage gauge 100, a 5 ampere 12-volt reset breaker 102, a 12-volt solenoid 104, a 12-volt low side red indicator light 106, a 12-volt high side red indicator light, a 12-volt relay 108, a 12-volt relay 110, a 12-volt solenoid 112, a first approximately 130–160 ampere alternator 116, and a second approximately 130–160 ampere alternator 118.

It is to be understood that the present invention is not limited to the embodiments described above, but encompasses any and all embodiments within the scope of the following claims.

We claim:

1. A quick start unit comprising:
   a platform base;
   three wheels attached to the platform base for supporting the platform base;
   a handle connected to the platform base;
   an engine mounted on the platform base;
   an alternator mounted on the platform base;
   a cranking battery mounted on the platform base;
   a control panel mounted on the platform base;
   two automatic reset breakers mounted on the platform base;
   one relay mounted on the platform base; and
   one solenoid mounted on the platform base.

2. The quick start unit according to claim 1, wherein said alternator provides a 130–160 amperage output.

3. The quick start unit according to claim 1, wherein said automatic reset breakers are 5 amperage 12-volt automatic reset breakers, said relay is a 12-volt relay, and said solenoid is a 12-volt solenoid.

4. The quick start unit according to claim 1, wherein said handle comprises a plurality of laterally extending arms.

5. The quick start unit according to claim 1, wherein said control panel comprises:
   a push button;
   a two position power toggle switch;
   a two position alternator toggle switch;
   one amperage gauge;
   two voltage gauges;
   a green indicator light;
   an amber indicator light;
   a red indicator light; and
   an audible alarm.

6. The quick start unit according to claim 5, wherein said push button is a 12-volt push button, said two position power toggle switch is a 12-volt, two position power toggle switch, and said two position alternator toggle switch is a 12-volt, two position alternator toggle switch.

7. A quick start unit comprising:
   a platform base;
   three wheels attached to the platform base for supporting the platform base;
   a handle connected to the platform base;
   an engine mounted on the platform base;
   two alternators mounted on the platform base;
   a cranking battery mounted on the platform base; and
   a control panel mounted on the platform base;
   three automatic reset breakers mounted on the platform base;
   two relays mounted on the platform base; and,
   two solenoids mounted on the platform base.

8. The quick start unit according to claim 7, wherein each said alternator provides a 130–160 amperage output.

9. The quick start unit according to claim 7, wherein said automatic reset breakers are 5 amperage 12-volt automatic reset breakers, said relays are 12-volt relays, and said solenoids are 12-volt solenoids.

10. The quick start unit according to claim 7, wherein said handle comprises a plurality of laterally extending arms.

11. The quick start unit according to claim 7, wherein said control panel comprises:
    a push button;
    a two position power toggle switch;
    a three position alternator toggle switch;
    a three position alternator toggle switch;
    two amperage gauges;
    two voltage gauges;
    a green indicator light;
    an amber indicator light;
    a red indicator light; and
    an audible alarm.

12. The quick start unit according to claim 11, wherein said push button is a 12-volt push button, said 12-volt, two position power toggle switch is a 12-volt, two position power toggle switch, and said three position alternator toggle switch is a 12-volt, three position alternator toggle switch.

* * * * *